United States Patent
Schile

(10) Patent No.: US 7,528,200 B2
(45) Date of Patent: May 5, 2009

(54) EPOXY HARDENER SYSTEMS BASED ON AMINOBIS(METHYLENE-ETHYLENEUREA)

(75) Inventor: Richard D. Schile, Ridgefield, CT (US)

(73) Assignee: ARDES Enterprises, Inc., Ridgefield, CT (US)

( * ) Notice: Subject to any disclaimer, the term of this patent is extended or adjusted under 35 U.S.C. 154(b) by 387 days.

(21) Appl. No.: 11/345,509

(22) Filed: Feb. 1, 2006

(65) Prior Publication Data

US 2007/0179257 A1    Aug. 2, 2007

(51) Int. Cl.
*C07D 233/24*    (2006.01)
*C08G 59/14*    (2006.01)

(52) U.S. Cl. .................... 525/523; 548/324.5
(58) Field of Classification Search .......... 525/523; 548/324.5
See application file for complete search history.

(56) References Cited

U.S. PATENT DOCUMENTS

| | | | | |
|---|---|---|---|---|
| 3,105,826 A | * | 10/1963 | Jaggard | 428/413 |
| 3,320,274 A | * | 5/1967 | Lloyd | 548/324.5 |
| 3,337,288 A | * | 8/1967 | Horiguchi et al. | 8/552 |
| 3,356,627 A | * | 12/1967 | Scott | 524/516 |
| 3,369,008 A | * | 2/1968 | Hurwitz | 526/263 |
| 4,248,754 A | * | 2/1981 | Fox et al. | 524/377 |
| 5,496,907 A | * | 3/1996 | Dochniak | 528/73 |
| 6,166,220 A | * | 12/2000 | Singh et al. | 548/313.4 |
| 6,288,151 B1 | * | 9/2001 | Lassila et al. | 524/100 |
| 6,491,845 B1 | | 12/2002 | Schile | |
| 6,617,389 B1 | * | 9/2003 | Delaunoit et al. | 524/555 |
| 6,632,527 B1 | * | 10/2003 | McDaniel et al. | 428/402 |
| 6,743,375 B2 | | 6/2004 | Schile | |
| 6,858,654 B1 | * | 2/2005 | Wendel et al. | 521/129 |

* cited by examiner

*Primary Examiner*—Mark Eashoo
*Assistant Examiner*—Megan McCulley
(74) *Attorney, Agent, or Firm*—Notaro & Michalos P.C.

(57) ABSTRACT

An epoxy-hardener system is provided having relatively long latency periods combined with relatively short cure times at low cure temperatures. The hardeners of the present invention are ureidoamines and their derivatives, which are chelates of ureido compounds and amines. The ureidoamines are prepared by reacting an amine with the ureido compound and aqueous formaldehyde without a catalyst. Complexes of ureidoamine hardeners with various blocking agents are prepared in the melt. The hardener is prevented from curing the epoxy by the reaction between the hardener and the blocking agent. The blocked hardener is then blended with the epoxy, usually by warming the mixture briefly at about 50-60 degrees C.

8 Claims, No Drawings

EPOXY HARDENER SYSTEMS BASED ON AMINOBIS(METHYLENE-ETHYLENEUREA)

FIELD AND BACKGROUND OF THE INVENTION

The present invention relates generally to the field of epoxy hardeners and in particular to new and useful hardeners for epoxy compositions.

Epoxy resins are used extensively in industry for the production of highly diverse articles of manufacture from aerospace structures to sporting goods. Cured epoxies have excellent adhesive strength with a variety of substrates, good to excellent strength and toughness and good resistance to solvents and chemicals. The best properties are obtained from combinations of epoxy resins and various active hydrogen hardeners which produce thermosetting copolymer systems. Epoxy resins are industrial commodities.

Epoxy hardeners are extremely diverse, including primary and secondary polyamines, tertiary amines, polyphenols, polycarboxylic acids, cyclic anhydrides, acidic polyols and combinations of these.

Mixtures of epoxy resins and hardeners and various other modifiers, diluents, fillers, etc. are cured either at ambient temperature or at elevated temperature for a time sufficient to convert the initial liquid mixture to a solid copolymer having useful properties. This procedure is referred to as the cure process or "curing."

The cure temperature and cure time vary extensively depending on the chemical characteristics of the epoxy-hardener system. The liquid prepolymer mixture will gradually increase in viscosity over a period of time at ambient temperature. Depending on the nature of the manufacturing process, the time for the viscosity of the epoxy-hardener mixture to increase to a predetermined value is referred to as the "latency period", "pot life",or "joint open time." As a practical matter, these times determine the time available for various adhesive bonding processes involving metal or composite adherends or fiber-reinforced composite materials or the cycle times of various thermosetting molding processes.

Increasing emphasis on reducing manufacturing costs has focused attention on the development of epoxy-hardener systems having relatively long latency periods combined with relatively short cure times at low temperatures. This combination presents some very difficult design problems. In general, cure times and latency periods track together; increasing the latency period by changing a formulation generally results in an increase in the cure time. It is only by changing the chemical characteristics of the hardener system that increased latency combined with shorter cure times can be obtained.

Polyamine hardeners give relatively short latency periods and will undergo partial curing at ambient temperature. However, properties are improved by a postcure at a temperature above ambient. Various combinations of polyamines and tertiary, amines will cure at moderate temperatures with somewhat longer latency periods and aromatic polyamines and cyclic anhydride curing agents will provide still longer latency periods but good properties require a postcure at relatively high temperatures. New epoxy hardeners which can meet current industry requirements are needed to provide short cures at relatively low temperatures combined with relatively long periods of latency.

Latent epoxy hardeners consisting of combinations of tertiary amines and acidic polyols have been described in U.S. Pat. Nos. 6,491,845 B1 and 6,743,375 B2. The described tertiary amines were those which were commercially available at the time. However, demands for increases in latency and decreases in cure time have resulted in a search for new amine-type epoxy hardeners which can meet these new performance criteria.

SUMMARY OF THE INVENTION

It is an object of the present invention to provide epoxy-hardener systems having relatively long latency periods combined with relatively short cure times at low temperatures.

It is a further object of the present invention to provide hardeners having good inherent latency properties with epoxy resin and which can be blocked efficiently by acidic materials to provide longer latency periods and shorter curing times.

Accordingly, hardeners for epoxy resins are provided which have the capability of faster curing at lower temperatures than existing hardeners while simultaneously providing longer latency periods than existing hardeners. They are easily handled liquid materials having a range of viscosities and are made from cheap and readily available industrial chemicals. They have low vapor pressure at ambient temperature, have no noxious odors and do not carbonate in air. Curing reactions with epoxy resins exhibit low exotherm and give cured products having exceptionally low cure shrinkage, high tensile strength and high toughness.

The hardeners of the present invention are aminobis(methylene-ethyleneureas)which are chelates of ehyleneurea and amines. Prefered amines include primary monoamines, and mixed primary-teriary diamines.

All of the ureidoamine hardeners are prepared by reacting an amine with either ethyleneurea, 1,3-dimethylurea or propyleneurea and aqueous formaldehyde without a catalyst.

Blocking agents for aminobis(methylene-ethyleneurea) hardeners are either hydroxy acids such as 2,2-bis(hydroxymethyl)butyric acid or methylenebis(ethyleneurea) which forms a complex with an amine nitrogen atom due to the close proximity of the two carbonyl groups. The hydroxyacid can be combined directly with aminobis(methylene-ethyleneurea) provided reaction can be avoided by keeping the temperature well below the reaction temperature of approximately 150 degrees C. The hydroxy acid which is in solution in the hardener mixture forms a complex with the available tertiary amine nitrogen atom. The complex does not catalyze the epoxy curing reactions below the activation temperature and the combination is latent. Methylenebis(ethyleneurea) is an excellent non-reactive solvent for a hydroxyacid such as 2,2-bis(hydroxymethyl)butyricacid and forms a resinous, low-melting complex at 1:1 molar ratio at about 50 degrees C. which is soluble in both aminobis(methylene-ethyleneurea) and the epoxy. All of these hardener components react rapidly with the epoxy at the cure temperature while providing excellent latency at ambient temperature.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Ethyleneurea (2-imidazolidone) is a relatively cheap heterocycle, m.p. 133-135 degrees C. and insoluble in epoxy resins below the melting point. It is a very weak base and reacts with epoxy at an impractically low rate. However, if a primary amine is combined with two moles ethyleneurea and two moles formaldehyde, a new compound is produced in which the nitrogen atom of the amine and the methylene bridge connecting this nitrogen atom to either ureido nitrogen atom combine to produce a chelate structure in which the amine nitrogen can donate electrons directly to the ureido oxygen atom. This nullifies the internal electron shift on the ureido nitrogen atoms toward the carbonyl group and activates the ureido hydrogen atoms so that they can react with epoxy. A wide variety of epoxy hardeners having useful properties can be produced by applying this principle.

In addition to ethyleneurea, two other ureido compounds, propyleneurea(tetrahydro-2-pyrimidone), m.p. 264-266 degrees C. and 1,3-dimethylurea, m.p. 101-104 degrees C. are chemically equivalent. Ethyleneurea is the preferred parent compound.

There are two main types of aminobis(methylene-ethyleneurea) compounds: The first type consists of the product formed by reacting 1 mole of a primary amine RNH2 with 2 moles formaldehyde and 2 moles ethyleneurea where R contains carbon atoms and possibly oxygen atoms but does not contain any amine nitrogen atoms. This type of hardener does not have any capacity to catalyze the epoxy-hydroxy crosslinking reactions and is an epoxy modifier and co-curative only. There are also some other hardeners which do not have precisely the same structure but which do not catalyze epoxy crosslinking reactions. The second type of aminobis (methylene-ethyleneurea) hardener has the same overall structure but the R group contains a tertiary amine or imidazole. For example, R=dialkylaminopropyl- where the alkyl is either methyl or ethyl; or R=imidazolylpropyl-. This type of aminobis(methylene-ethyleneurea) hardener has both chain extension and crosslinking capabilities.

Hardeners Based on Aminomethylene-ethyleneureas.

The useful chemical reactions are between ethyleneurea and either primary monoamines or mixed primary-tertiary diamines and formaldehyde. Any of these amines may contain additional hydroxyl groups or ether groups.

A primary monoamine RNH2 can react with two moles formaldehyde and two moles ethyleneurea to produce the structure (I).

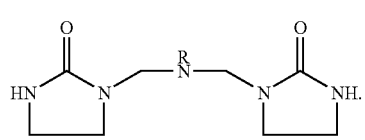
(I)

If R does not contain any additional nitrogen atoms, the single central tertiary nitrogen atom is shared between the two carbonyl groups but is sterically hindered and the material is essentially devoid of catalytic activity. However it is capable of reacting with epoxy at either ambient temperature or elevated temperature depending on the basicity of the amine RN and can be used to modify the epoxy resin, either by adding it to the hardener package or by pre-reacting it with the epoxy. When the modified epoxy is subsequently cured, the increased hydroxyl concentration increases the cure rate markedly. The fastest cures are obtained by pre-reacting this difunctional modifier with the epoxy.

If R contains a tertiary amine, the hardener molecule is both a chain extender and a catalytic hardener Examples of two primary/tertiary amines are N,N-dialkyl-1,3-propanediamine where alkyl is methyl or ethyl and 1-(3-aminopropyl) imidazole.

Preferably, for structure (I), R is an alkyl containing from 1 to 12 carbon atoms, allyl-, benzyl-, 2-hydroxyethyl-, 2-hydroxyisopropyl-, 3-hydroxy-1-propyl-, 3-ethoxypropyl-, 3-propoxypropyl-, 3-isopropoxypropyl-, 2-(2-hydroxyethoxy)ethyl-, 3-(dimethylamino)propyl-, 3-(diethylamino) propyl-, or 3-(1-imidazolyl)propyl- or R may be a cyclic group in which R represents cyclohexyl-; 3-(pyridyl)methyl-; 2-pyridyl-; 2,4-diethyl-N-anilino-; 2,6-diethyl-N-anilino-; or 2-pyrimidyl-.

Primary monoamines useful in the preparation of structure (I) are as follows: RNH2 is an alkyl monoamine containing from one to twelve carbon atoms in the alkyl group; allylamine; benzylamine; ethanolamine; isopropanolamine; 3-amino-1-propanol; 3-ethoxypropylamine; 3-propoxypropylamine; 3-isopropoxypropylamine; 2-(2-aminoethoxy) ethanol; 3-(dimethylamino)propylamine, 3-(diethylamino) propylamine; 1-(3-aminopropyl) imidazole; cyclohexylamine; 3-(aminomethyl)pyridine; 2-aminopyridine; 2,4-diethylaniline; 2,6-diethylaniline; 2-aminopyrimidine.

Oligomers of higher molecular weight based on Structure (I) can be produced by increasing the amount of formaldehyde. For example, Structure (I) contains 2 moles ethyleneurea, 2 moles formaldehyde and 1 mole of a primary monoamine. The dimer of (I) would be formed from 4 moles ethyleneurea, 5 moles formaldehyde and 2 moles of a primary monoamine.

Such higher molecular weight materials may be useful in improving cured properties and in providing extended latency with tertiary amine type catalytic hardeners. However, it should be expected that cure times will increase with the use of these higher molecular weight materials.

Oligomers of higher molecular weight based on Structure (I) can be produced by increasing the amount of formaldehyde. For example, Structure (VI) contains 2 moles ethyleneurea, 2 moles formaldehyde and 1 mole of a primary monoamine. The dimer of (VI) would be formed from 4 moles ethyleneurea, 5 moles formaldehyde and 2 moles of a primary monoamine as shown below as Structure VIa.

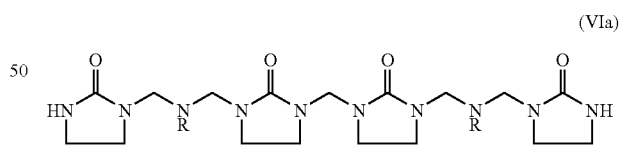
(VIa)

Another possibility is 4 moles of ethyleneurea, 4 moles formaldehyde and 1 mole of a primary monoamine, resulting in the oligomer shown below as Structure VIb.

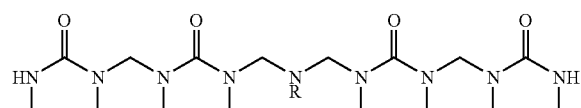
(VIb)

Such higher molecular weight materials may be useful in improving cured properties and in providing extended latency with tertiary amine type catalytic hardeners. However, it should be expected that cure times will increase with the use of these higher molecular weight materials.

One approach to improving latency is to combine a hardener such as shown in Structure (I) which contains a tertiary amine or imidazole in the R group with a blocking agent which will bond to this tertiary amine nitrogen atom at ambient temperature but release it at the cure temperature which will preferably be a low temperature such as about 75 degrees C. This delicate task is performed well by the compound methylenebis(ethyleneurea) which has a structure which places the two carbonyl groups close together, forming an attractive bonding site for a nitrogen atom. While this material is not commercially available, urea-formaldehyde technology is well established and preparation is simple using 1 pph of a basic catalyst such as dimethylamine which need not be removed from the product. This material is mixed with the other hardener components at a ratio of one mole per nitrogen atom to be blocked. It is fully compatible and cures an epoxy in about 30 minutes at 75 degrees C. when base-catalyzed as indicated. Latency periods are about 8 hours.

A hydroxyacid can also be combined directly with a ureidoamine provided the condensation reaction can be avoided by keeping the mixing temperature well below the reaction temperature of approximately 150 degrees C. The hydroxy acid which is in solution in the hardener mixture forms a complex with the available tertiary amine nitrogen atom. The complex does not catalyze the epoxy curing reactions below the activation temperature and the combination is latent. Methylenebis(ethyleneurea) is an excellent non-reactive solvent for a hydroxyacid such as 2,2-bis(hydroxymethyl)butyricacid and forms a resinous, low-melting complex at 1:1 molar ratio at about 50 degrees C. which is soluble in both the ureidoamine and the epoxy. The use of this ureido compound greatly facilitates the mixing of the various hardener components at a low temperature. All of these hardener components react rapidly with the epoxy at the cure temperature while providing excellent latency at ambient temperature.

Preparation of Ureidoamine Hardeners.

The same process is used to prepare all of the ureidoamine compounds disclosed. While the process is a simple one, the temperature conditions are exacting and must be strictly adhered to. Bench scale preparation requires a reaction flask, condenser, stir bar, stirring hot plate, water/ice bath and electronic thermometer with a stainless steel probe. An electronic thermometer is required because it has a fast response and does not require a stem correction.

The reaction involves an amine, water, formaldehyde and ethyleneurea. The order of addition is amine first, then water of dilution, then aqueous formaldehyde, then ethyleneurea.

The amine is first weighed into the flask and distilled water is added, the weight of which is equal to the weight of ethyleneurea which is to be added at a later step. The purpose of adding water at this step is to allow the exotherm which occurs when the amine reacts with water to dissipate before adding aqueous formaldehyde, thereby minimizing the temperature rise during formaldehyde addition. The extra mass of water also helps to minimize the temperature rise. The stir bar is added and the flask is clamped into a cold bath of water and ice and stirred until the temperature has fallen to 5-10 degrees C. The required weight of formaldehyde is weighed into a beaker and slow addition to the flask is begun using a dropper while closely monitoring the temperature of the mixture. Formaldehyde addition is stopped before the temperature reaches 15 degrees C. and the temperature is allowed to fall back to 5-10 degrees C. before adding more formaldehyde.

The temperature must not rise above 15 degrees C. during formaldehyde addition. The methylolamine which is formed at this stage associates through the hydroxy groups which protects the unreacted amine hydrogens until the temperature reaches about 30-35 degrees C. at which point the complex dissociates, the methylols condense with amine and the process fails.

When the formaldehyde addition has been completed, the beaker is rinsed with a little distilled water and added to the flask. The required amount of ethyleneurea is now weighed out, the stirrer speed increased to medium high and the ethyleneurea added to the flask all at once through a plastic funnel. The temperature will immediately fall to about 0-5 degrees C. as the ethyleneurea dissolves. The ice should now be removed from the cold bath, the water level in the bath brought up to the level of the contents of the flask, the condenser attached and heating begun at a rate which brings the temperature up to 90 degrees C. in about half an hour. All of the ethyleneurea will be in solution by the time the bath temperature reaches about 35-40 degrees C. The mixture should be heated for 2 hours at 90 degrees C. at the end of which it can be poured into an evaporating dish and dried to constant weight at a liquid temperature of 60-70 degrees C. The products of this reaction are typically colorless to pale amber viscous liquids or amorphous semi-solids of little or no odor. They do not carbonate in air and are soluble in epoxy resins.

EXAMPLES

In the examples given below, the notation A/B denotes a chemical reaction between the two chemical compounds A and B, using formaldehyde as appropriate. The epoxy resin was Epon828 in all cases.

This hardener was prepared by reacting 2 moles ethyleneurea with one mole DEAPA [3-(diethylamino)propylamine] and 2 moles formaldehyde according to the procedure previously described and is an example of Structure (I). It is both a chain extender and a catalytic hardener. The physical form of this material was a highly viscous resin at ambient temperature. The recommended minimum concentration in Epon828 is 7.5 phr. 20 phr of this hardener (a large excess) was blended with Epon828 and maintained at ambient temperature, resulting in a three-fold viscosity increase after 4 hours. The cure time was 1 hour at 75 degrees C.

Example 2

2EU/API Blocked with MBEU

This sample contained 15 phr 2EU/API (API is 1-(3-amino propyl) imidazole) and 8.6 phr MBEU [methylenebis(ethyleneurea)] as blocker for the R-group imidazole as shown in Structure (I). The cure time was 35 minutes at 75 degrees C.

After 12 hours at ambient temperature, the viscosity of the epoxy-hardener mixture increased by 1.7 times.

Example 3

2EU/DEAPA Blocked with DMBA.MBEU 3.4 phr DMBA [2,2-bis(hydroxymethyl)butyricacid] and 4.22 phr MBEU [methylenebis (ethyleneurea)] were heated at about 50 degrees C. for a brief period; the DMBA dissolved rapidly resulting in a clear solution which was a tacky, resinous, low-melting solid at ambient temperature. 7.5 phr 2EU/DEAPA was then added and blended briefly at about 50 degrees C. followed by blending with the epoxy. This mixture cured in 2¼ hours at 75 degrees C. The viscosity of the epoxy-hardener mixture increased by a factor of 3 after 3 days at ambient temperature.

What is claimed is:

1. A composition comprising:
   an epoxy resin; and
   a reaction product that contains at least one aminobis(methylene-ethyleneurea) as a hardener and a blocking agent for blocking said aminobis(methylene-ethyleneurea).

2. A composition according to claim 1, wherein the blocking agent is at least one hydroxy acid selected from the group consisting of 2,2-bis(hydroxymethyl)butyricacid, 2,2-bis(hydroxymethyl)propionic acid and glycolic acid, or methylenebis(ethyleneurea), or a combination of at least one of said hydroxy acids and methylenebis(ethyleneurea).

3. A composition according to claim 1, wherein an amine compound of the aminobis(methylene-ethyleneurea) is selected from the group consisting of one of primary monoamines, and primary-tertiary diamines.

4. A composition according to claim 1, wherein the aminobis(methylene-ethyleneurea) is:

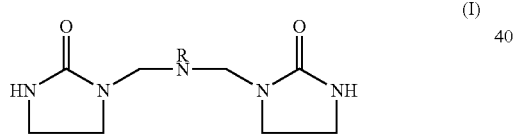

wherein R is an alkyl containing from 1 to 12 carbon atoms, allyl-, benzyl-, 2-hydroxyethyl-, 2-hydroxyisopropyl-, 3-hydroxy-1-propyl-, 3-ethoxypropyl-, 3-propoxypropyl-, 3-isopropoxypropyl-, 2-(2-hydroxyethoxy)ethyl-, 3-(dimethylamino)propyl-, 3-(diethylamino)propyl-, or 3-(1-imidazolyl)propyl-; or R is a cyclic group in which R is cyclohexyl-, 3-(pyridyl)methyl-, 2-pyridyl-, 2,4-diethyl-N-anilino-, 2,6-diethyl-N-anilino-, or 2-pyrimidyl-.

5. A composition according to claim 4, wherein the aminobis(methylene-ethyleneurea) is an oligomer of structure (I) and is:

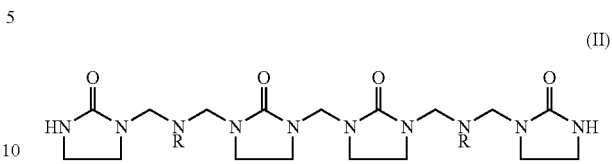

wherein R is an alkyl containing from 1 to 12 carbon atoms, allyl-, benzyl-, 2-hydroxyethyl-, 2-hydroxyisopropyl-, 3-hydroxy-1-propyl-, 3-ethoxypropyl-, 3-propoxypropyl-, 3-isopropoxypropyl-, 2-(2-hydroxyethoxy)ethyl-, 3-(dimethylamino)propyl-, 3-(diethylamino)propyl-, or 3-(1-imidazolyl)propyl-; or R is a cyclic group in which R is cyclohexyl-, 3-(pyridyl)methyl-, 2-pyridyl-, 2,4-diethyl-N-anilino-, 2,6-diethyl-N-anilino-, or 2-pyrimidyl-.

6. A blocked hardener composition for mixing with an epoxy to cure the epoxy, the blocked hardener composition comprising:
   an aminobis(methylene-ethyleneurea); and
   a hydroxy acid selected from the group consisting of 2,2-bis(hydroxymethyl)butyric acid and 2,2-bis(hydroxymethyl)propionic acid and glycolic acid, or methylenebis(ethyleneurea), or a combination of at least one of said hydroxy acids and methylenebis(ethyleneurea);
   wherein the blocked hardener is soluble in epoxy resin.

7. A blocked hardener composition according to claim 6, wherein an amine compound of the aminobis(methylene-ethyleneurea) is selected from the group consisting of primary monoamines, and primary-tertiary diamines.

8. A blocked hardener composition according to claim 6, wherein the aminobis(methylene-ethyleneurea) is selected from the group consisting of structures (I) and (II):

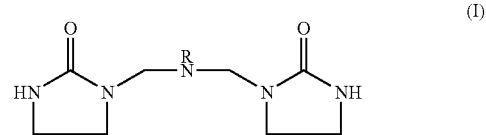

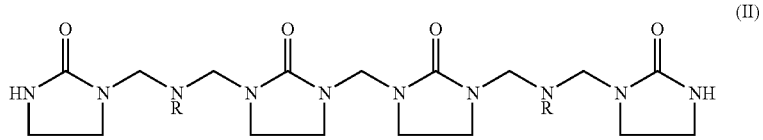

wherein R is an alkyl containing from 1 to 12 carbon atoms, allyl-, benzyl-, 2-hydroxyethyl-, 2-hydroxyisopropyl-, 3-hydroxy-1-propyl-, 3-ethoxypropyl-, 3-propoxypropyl-, 3-isopropoxypropyl-, 2-(2-hydroxyethoxy)ethyl-, 3-(dimethylamino)propyl-, 3-(diethylamino)propyl-, or 3-(1-imidazolyl)propyl-; or R is a cyclic group in which R represents cyclohexyl-; 3-(pyridyl)methyl-; 2-pyridyl-; 2,4-diethyl-N-anilino-; 2,6-diethyl-N-anilino-; or 2-pyrimidyl-.

* * * * *